United States Patent Office 3,476,799
Patented Nov. 4, 1969

---

3,476,799
PROCESS FOR THE MANUFACTURE OF NITRILO-TRIS-METHYLENE PHOSPHONIC ACID
Wilhelm Vogt and Hermann Glaser, Knapsack, near Cologne, Germany, assignors to Knapsack Aktiengesellschaft, Knapsack, near Cologne, Germany, a corporation of Germany
No Drawing. Filed Nov. 30, 1966, Ser. No. 597,882
Claims priority, application Germany, Dec. 16, 1965,
K 57,930
Int. Cl. C07f 9/38
U.S. Cl. 260—502.5      9 Claims

---

ABSTRACT OF THE DISCLOSURE

Process for making nitrilo-tris-methylene phosphonic acid from ammonia, formaldehyde and a compound of trivalent phosphorus.

---

Nitrilo-tris-methylene phosphonic acid has recently been gaining increasing technical and commercial interest, and as the result of its property to form complex salts with numerous metal compounds, it has been found to be especially suitable for use in the production of detergents to serve as an additive for the softening of water. However, the production of this compound on a commercial scale for use as a detergent component calls for the development of a commercially attractive process, not disclosed heretofore in the art.

As taught in French Patent 1,342,412, amino-alkylene phosphonic acid is generally available by reaction of ammonia or an amine or a suitable ammonium salt with an aldehyde or ketone and orthophosphorous acid with the resultant formation of amino-mono-, di- or tri-alkylene phosphonic acid, depending on the quantitative ratio in which the starting components are being used. When an ammonium salt and formaldehyde are used and reacted with the object of obtaining nitrilo-tris-methylene phosphonic acid, the conventional reaction is found to be based on the following reaction Equation I:

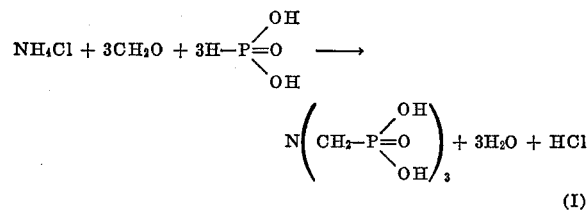

(I)

The above equation indicates that the starting materials are used in a molar ratio of 1:3:3. The formaldehyde or orthophosphorous acid can, however, also be used in excess with respect to the ammonium chloride without impairing the yield of desirable product. On the other hand, when ammonium chloride is used in an excess with respect to the other components, then a mixture of amino-mono-, di and trimethylene phosphonic acids will be obtained. This conventional process is carried out, for example by reflux-heating an aqueous solution of orthophosphorous acid and ammonium chloride to a temperature between 75 and 200° C. and gradually adding an aqueous formaldehyde solution of 37% strength. After the reaction and after cooling of the reaction mixture down to a temperature of 20% C., nitrilo-tric-methylene phosphonic acid is found to precipitate from the aqueous solution, and it is separated. According to a further feature of this earlier process, it is necessary always to maintain in the reaction mixture a pH-value of less than 4, preferably a pH-value of 2. It is also possible in this process to replace the aqueous formaldehyde solution with paraformaldehyde. In French Patent 1,342,412, it is suggested that a small proportion of a halogen compound, e.g. hydrochloric, hydrobromic or hydriodic acid or a salt of these acids, be advantageously added to the starting mixture in order to prevent ortho-phosphoric acid from being formed from the ortho-phosphorous acid.

The use of paraformaldehyde and more particularly of phosphorous acid for making nitrilo-tric-methylene phosphonic acid is a commercially unattractive procedure because the two substances are too costly for use on an industrial scale. The production of phosphorous acid implies subjecting phosphorus trichloride to hydrolysis in separate production facilities.

It has now unexpectedly been found that nitrilo-tris-methylene phosphonic acid can be prepared under very economic conditions by replacing phosphorous acid with a compound of trivalent phosphorus available at low price and hydrolyzable into phosphorous acid, and by replacing paraformaldehyde with an aqueous formalin solution.

The process of the present invention for making nitrilo-tris-methylene phosphonic acid, wherein ammonia or an ammonium salt is reacted with formaldehyde and a compound of trivalent phosphorus in aqueous solution, in the molar ratio of about 1:3:3, at a temperature between about 70 and 200° C. while maintaining a pH-value of at most 4 in the reaction mixture, and wherein nitrilo-tris-methylene phosphonic acid, precipitating after the reaction from the cooled reaction mixture, is isolated, comprises more especially using phosphorus trichloride as the compound of trivalent phosphorus.

A preferred feature of the process of the present invention comprises gradually adding phosphorus trichloride to the aqueous solution of a mixture formed of ammonia or an ammonium salt and formaldehyde, the phosphorus trichloride being added while cooling to maintain a temperature of less than 70° C., peferably of between 60 and 70° C., and, after hydrogen chloride has ceased to be evolved, heating the reaction mixture for a further short period of time, e.g. for a period between 30 miuutes and 1 hour, to a temperature varying between about 70° C. and the boiling point of the mixture, preferably between about 110 and 115° C., cooling the whole down to room temperature and isolating precipitated nitrilo - tris-methylene phosphonic acid by subjecting the reaction mixture to filtration or centrifugation.

The aqueous formaldehyde solution used as the starting material generally contains 30 to 37% by weight formaldehyde, the calculated amount of ammonia being introduced thereinto in gas form or being added thereto in the form of a concentrated aqueous solution. The resulting solution is then reacted with the phosphorus trichloride which is first hydrolyzed to give hydrogen chloride and ortho-phosphorous acid, the acid being reacted then with the ammonia and formaldehyde.

A further feature of the process of the present invention comprises substituting an addition product of ammonia with formaldehyde, e.g. hexamethylene tetramine, for the ammonia as the starting material. In this case, the reaction underlying the present invention takes the course shown in the followig reaction Equation II, in which the hexamethylene tetramine is identified by the summation formula $C_6H_{12}N_4$:

$C_6H_{12}N_4 + 6CH_2O + 12PCl + 30H_2O \longrightarrow$

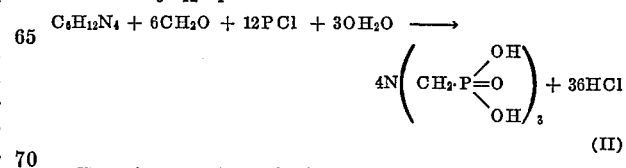

(II)

Equation II above indicates that ammonia, formaldehyde and phosphorus trichloride are used again as in Equation I in a molar ratio of 1:3:3 taking into account that the hexamethylene tetramine is formed of 4 mols ammonia and 6 mols formaldehyde.

The following statements are intended more fully to illustrate the present invention.

For carrying out the present process, a defined proportion of gaseous ammonia or a concentrated aqueous solution of ammonia should conveniently be introduced into a formalin solution having a strength of 30 to 37% by weight, and phosphorus trichloride should gradually be added with thorough mixing to the mixture so made. The evolution of gaseous hydrogen chloride indicates that the phosphorus trichloride immediately undergoes hydrolysis resulting in the formation of ortho-phosphorous acid. When the gas ceases to be evolved, the reaction mixture is heated for a further 30 to 60 minutes to a temperature of 110 to 115° C. When cooled to room temperature, crystallized nitrilo-tris-methylene phosphonic acid is found to precipitate from the reaction solution. It can be isolated in conventional manner, e.g. by filtration or centrifugation. The mother liquor obtained thereby, which is found to contain small amounts of amino-mono- or dimethylene phosphonic acid as by-products dissolved therein, can be re-used. In order to obviate losses in phosphorus trichloride in the present reaction, which may occur as a result of phosphorus trichloride portions being expelled by the stream of hydrogen chloride escaping from the reaction mixture, a portion of the aqueous starting solution receiving the phosphorus trichloride should advantageously be supplied via a wash column, countercurrently to the escaping hydrogen chloride, to the reactor.

The substitution of phosphorus trichloride for phosphorous acid in the process of the present invention offers various technical and commercial advantages. Phosphorus trichloride is a low price starting material which can directly be reacted with the other reaction components, and it need not be transformed previously in a separate apparatus into phosphorous acid. The present reaction taking place in the aqueous phase, the phosphorus trichloride can be hydrolyzed in the aqueous starting solution. In other words, nitrilo-tris-methylene phosphonic acid can be produced in a single step. Furthermore, hydrogen chloride is produced in sufficient quantity by the phosphorus trichloride undergoing hydrolysis, which means that the separate addition of hydrogen chloride to the reaction mixture, intended to stabilize the ortho-phosphorous acid, is unnecessary.

EXAMPLE 1

42 grams or 0.3 mol hexamethylene tetramine were dissolved in 180 cc. water and the resulting solution was combined with 160 grams or 1.9 mols of a formalin solution having a strength of 36% by weight. 495 grams or 3.6 mols phosphorus trichloride were added dropwise to the above mixture with strong agitation and while cooling, so as to maintain the reaction mixture at a temperature between 60 and 70° C. The hydrogen chloride evolved by the hydrolysis was continuously removed. When the hydrogen chloride ceased to be evolved, the reaction mixture was heated for a further 60 minutes to a temperature of 110° C. and then cooled down to room temperature, and nitrilo-tris-methylene phosphonic acid was found to precipitate in crystalline form from the aqueous solution. The acid was filtered off and dried. The yield of nitrilo-tris-methylene phosphonic acid was 54%, referred to the quantity of phosphorus trichloride used.

The mother liquor was found to contain amino-dimethylene phosphonic acid and amino-monomethylene phosphonic acid as by-products in a proportion of 26 and 20%, respectively, referred to the quantity of phosphorus trichloride.

EXAMPLE 2

Gaseous ammonia was introduced—for the formation of hexamethylene tetramine—into 160 grams of a formalin solution having a strength of 36% by weight until the solution showed a slightly basic reaction, and a further 160 grams of a formalin solution having a strength of 36% by weight were then added. The resulting mixture was reacted in a manner analogous to that described in Example 1 with 495 grams $PCl_3$, and worked up. Nitrilo-tris-methylene phosphonic acid was obtained in a yield of 74%, amino-dimethylene phosphonic acid was obtained in a yield of 19%, and amino-methylene phosphonic acid was obtained in a yield of 7%, the yields being referred to the $PCl_3$ used.

EXAMPLE 3

A mixture formed of 132 grams hexamethylene tetramine and 500 grams of an aqueous formalin solution having a strength of 36% by weight was reacted with 1650 grams $PCl_3$, as set forth in Example 1. The hydrogen chloride escaping from the reaction mixture was scrubbed during the reaction, in a bubble tray column designed for low liquid load, with 600 grams water flowing countercurrently with respect to the hydrogen chloride. Hydrochloric acid leaving at the bottom of the column, which contained slight amounts of formaldehyde and phosphorous acid, was continuously supplied to the reactor. The reaction mixture was then boiled under reflux for a further 1 hour, cooled down to room temperature, and nitrilo-tris-methylene phosphonic acid was isolated in the manner set forth in Example 1. The mother liquor recovered, which contained small amounts of amino-methylene phosphonic acid and amino-dimethylene phosphonic acid, was used again for making further nitrilo-tris-methylene phosphonic acid.

The yield of nitrilo-tris-methylene phosphonic acid was 86%, referred to the phosphorus trichloride.

We claim:

1. A process for making nitrilo-tris-methylene phosphonic acid comprising contacting a:
   (1) hexamethylene tetramine reactant,
   (2) formaldehyde reactant, and
   (3) phosphorous trichloride reactant in aqueous solution effecting a reaction at about 70–200° C. and a pH of at most 4; the molar ratio of ammonia, formaldehyde and phosphorus trichloride in the reaction mixture being about 1:3:3, each mol of hexamethylene tetramine being formed of 4 mols ammonia and 6 mols formaldehyde.

2. The process of claim 1 which comprises gradually adding phosphorus trichloride to an aqueous solution of a mixture formed of formaldehyde and the amine reactant, the phosphorus trichloride being added while cooling to maintain a temperature of less than 70° C. and, after hydrogen chloride has ceased to be evolved, heating the reaction mixture for a short period of time to a temperature varying between 70° C. and the boiling point of the mixture, cooling the whole down to room temperature and isolating precipitated nitrilo-tris-methylene phosphonic acid from the reaction mixture.

3. The process of claim 2, wherein, after the hydrogen chloride ceased to be evolved, the reaction mixture is heated to a temperature between about 110 and 115° C.

4. The process of claim 1 wherein the necessary amount of amine reactant is introduced into an aqueous formaldehyde solution having a strength between 30 and 37% by weight, and phosphorus trichloride is then run into the solution obtained.

5. The process of claim 1 wherein the temperature during phosphorus trichloride addition to the aqueous solution is maintained within the range of 60 to 70° C.

6. The process of clam 1 wherein the amine reactant is formed from ammonia and formalin solution and the ammonia is used in gas form.

7. The process of claim 1 wherein the amine reactant is used in the form of an aqueous solution.

8. The process of claim 1, wherein the nitrilo-tris-methylene phosphonic acid is isolated by subjecting the reaction mixture to filtration.

9. The process of claim 1, wherein the nitrilo-trismethylene phosphonic acid is isolated by subjecting the reaction mixture to centrifugation.

References Cited

UNITED STATES PATENTS

| | | | |
|---|---|---|---|
| 2,684,286 | 7/1954 | Krieger | 23—165 |
| 3,154,546 | 10/1964 | Chessin | 260—248.5 |
| 3,288,846 | 11/1966 | Irani et al. | 260—502.5 |

FOREIGN PATENTS 1,342,412  9/1963  France.

LEON ZITVER, Primary Examiner

J. E. EVANS, Assistant Examiner

U.S. Cl. X.R.

260—248.5